Patented Jan. 13, 1942

2,270,006

UNITED STATES PATENT OFFICE 2,270,006

SEALING POROUS FORMATIONS

Harvey T. Kennedy, Forest Hills, Pa., assignor to Gulf Research & Development Company, Pittsburgh, Pa., a corporation of Delaware No Drawing. Application April 17, 1937, Serial No. 137,585

7 Claims. (Cl. 166—22)

This invention or discovery relates to sealing porous formations; and it comprises a method of sealing porous formations containing water which comprises injecting into the formation a compound of a polyvalent metal which carries at least one OR group wherein R is an alkyl or aryl group; which compound yields in the course of time through interaction with the water, a water insoluble plugging precipitate in the pores of the water bearing formation; the compound usually containing in admixture therewith a predetermined modicum of silicon tetrachloride, hydrochloric acid or other substance capable of accelerating the production of said water insoluble precipitate; all as more fully hereinafter set forth and as claimed.

In oil or gas wells, porous dry or water-containing strata are often encountered. The porous formations may be loose sand, porous sandstone or various other kinds of unconsolidated sediments or of hard rock. Water bearing strata of this type give much trouble in drilling wells. Unless the water can be shut off the well may be ruined. Expedients for shutting it off such as cementing, casing, etc., are costly and are often ineffective. The pressure encountered in such layers, particularly when they occur deep down in the earth, may be very high; several thousand pounds per square inch; and this makes provision of an effective seal difficult. Methods have been proposed for producing a sealing precipitate in the pores of the wet formation by chemical reaction, either with the water in the formation or with a subsequently injected reagent. Such methods have in many cases suffered from the shortcoming of not giving a precipitate far back from the bore. A precipitate localized at the bore walls is apt to be broken through by the water on release of pressure. Especially when the reagents are inorganic, precipitation is apt to take place quickly, close to the bore walls, and producing a plug which prevents injection of the reagents farther back into the formation. It has been attempted to overcome this defect by using very high injection pressures, but in such cases it is found that an excessive amount of the reagent finds its way into the adjacent oil bearing sands (if present) on account of the partial or complete plugging of the water bearing layer by the prematurely formed precipitate. Moreover, many types of well sealing agents have suffered from the fact that they are insufficiently fluent to enter fine pores. For a sealing agent to enter microscopic and capillary pores it must be thin and mobile.

In sealing water formations in wells, it is essential for success that no premature deposition of sealing agent take place in the well itself or at the walls of the bore; that deposition be delayed until after the liquid has penetrated deeply.

According to the present invention I provide a method of sealing water formations with the aid of sealing agents characterized by having a considerable inherent delay period before gelatinous or other sealing masses begin to form. This inherent delay period may be several hours or days. On injection of the sealing agent alone into the water-bearing formation, nothing happens for a considerable length of time, then the sealing mass begins to form, and the seal is completed after the lapse of more time. Thus even when injection takes a considerable time, on account of fine porosity of the formations, delays in pumping, etc., premature precipitation does not take place. On the other hand, excessive delay in production of the seal is undesirable, as it necessitates holding pressure on the well for a long time and also keeps the well out of production unduly long and moreover allows the sealing agent to be dissipated into all the surrounding region. Accordingly, in most cases I accelerate to a controlled degree the initiation of production of the sealing masses, by admixing with the sealing agent a substance calculated to hasten the reactions producing the sealing masses. By appropriate proportioning of the accelerator substance, I can cause initiation of the production of the seal, after the lapse of almost any desired period. Usually the proportion of accelerator is made such that the seal begins to form as soon as injection of the charge of sealing agent is complete; say one or two hours.

Thus, in my process there is used a sealing agent having, alone, an inherently long delay period between contact with water and production of a seal; the agent usually being used in conjunction with a substance adapted to shorten this delay period to some predetermined value.

The sealing agents which I have found best adapted for my purpose are compounds of polyvalent metals carrying at least one OR group wherein R is an alkyl or aryl radical. Such compounds are zinc ethylate $Zn(OC_2H_5)_2$, aluminum triphenolate $Al(OC_6H_5)_3$ and tri-chlor stannic ethylate $SnCl_3OC_2H_5$.

In some cases there is injected along with the compound a small amount of a substance capable of promoting the change into a stiff plugging mass. One such substance is silicon tetrachloride. Using a small amount of silicon tetrachloride dissolved in the metal compound, mixtures can be secured which hydrolyze completely in times ranging from a few minutes to 24 hours, depending upon the concentration of the accelerator and the temperature of the porous layer. The silicon tetrachloride likewise forms, on hydrolysis, a highly insoluble hydrated silica gel deposit. Ordinarily the injection of chemical water shut-off reagents into a well takes about an hour, though this time may vary considerably, due to local conditions. Ordinarily the time for hardening should not be less than one hour. On the other hand, it is desirable that the reagent should be completely hardened within a reasonable time, say one or two days, so that the well will not be out of production for an undue length of time. Hardening within a reasonable time is also desirable because otherwise the sealing agent being injected might be dissipated in the surrounding strata and produce precipitates at excessively great distances from the well. Thus ordinarily, I adjust the concentration of the accelerator so that reaction in the formation is completed in from one to forty-eight hours.

The rate of hardening of a given mixture depends greatly upon temperature, and the temperature of the water-containing layers depends largely upon the depths at which they occur. Thus, the amount of accelerator to be added depends on the temperature of the formation. Knowing the depth of the formation to be treated, its temperature may be estimated and the proper mixture chosen by trial, modified according to the rate of injection, the importance of bringing the well back in production as soon as possible and other factors.

Other substances than silicon tetrachloride can be admixed with the organic metal compound to accelerate production of a plugging precipitate. Metal chlorides of the type which form acid on going into solution are suitable; e. g. $FeCl_3$, $ZnCl_2$ and $CuCl_2$. Hydrochloric and other inorganic acids have similar effects and so have organic acids such as maleic acid. Silicon tetrachloride, and the metal chlorides mentioned, have certain advantages in oil field operations as they can be shipped in metal drums, no special containers being needed as in the case of hydrochloric acid. Also there is no attack on the pumps, piping, etc., during injection of the sealing material.

The pH of the formation waters influences the rapidity of hydrolysis of the organic silicate. Sometimes I adjust the pH of the organic silicate injection fluid, in accordance with the pH of the formation waters.

Various expedients used in chemical shut-off processes generally are applicable here. For example, if the stratum to be treated lies some distance above the well bottom, the lower portion of the well may be sealed off with a column of bentonite or a packer to prevent wastage of the reagent. The reagent may be injected into the formation under an oil load, since oil is lighter than the reagent.

The organic metal compounds described (and likewise silicon tetrachloride) are soluble in ethyl alcohol and other so-called "volatile solvents" such as ketones. It is sometimes convenient to inject the organic metal compound as a 5 or 10 per cent solution in one of these solvents; such a solution sometimes being easier to handle than the pure compound. Such a solution provides additional safeguard against premature precipitation, and makes for more regular action in the ground. Water diffuses readily into the alcohol, and contact of the organic metal compound and the water is thus facilitated. The organic metal compounds described are likewise soluble in petroleum and its fractions and may be conveniently injected as a solution therein.

The nature of the water in the water-bearing stratum is not vital to the success of my process. Thus, the method works satisfactorily whether the water be soft or hard, or a NaCl brine.

The organic metal compounds are inert to oil and therefore no harm is done if some reagent gets into the oil formation. It is flushed out upon resumption of production.

While the method has been described as being used in oil and gas well work it may be, of course, applied to sealing porous formations in other relations, such as in sinking shafts and the like generally. The same advantages result. The water in the water-bearing formation may be connate water existing in the formation or it may be supplied by injection prior to injection of the reagent. Thus, in sealing off a porous dry formation through which undesirable leakage of gas is taking place, a body of water may be injected into the formation prior to the injection of the reagent.

In general, compounds of the type represented by $M(OR)_n$ are useful; where M is a metal, R is an alkyl or aryl group and n is the valency of the metal. Among these alkylated inorganic compounds are aluminum phenolate, $Al(OC_6H_5)_3$; zinc ethylate, $Zn(OC_2H_5)_2$; etc. Examples of some suitable compounds, with their properties and in some cases their mode of preparation, are set forth below.

Titanium tetraphenolate, $Ti(OC_6H_5)_4$ is a dark red solid when crystallized from benzol, is soluble in benzol or petroleum and decomposes in the presence of water, forming an insoluble mass of titanic acid, $H_2TiO_3$. Other titanium alkylates, e. g. titanium ethylate and methylate, are useful. These can be prepared by action of the corresponding alcohol on titanium tetrachloride. They are soluble in oil, benzol and alcohol and are liquids at ordinary temperatures.

Aluminum triphenolate, $Al(OC_6H_5)_3$ is a gray or black solid, melting at 265° C., soluble in alcohol, benzol and petroleum and it hydrolyzes, forming alumina. It is made by heating phenol with aluminum or aluminum chloride in the presence of a suitable solvent for the triphenolate, e. g. carbon disulfide.

Aluminum propylate, $Al(OC_3H_7)_3$ is a solid melting at 107° C., with a specific gravity at 20° of 1.058. It is soluble in alcohol, benzol and oil, and decomposes in water, forming alumina. It can be prepared by the action of propyl alcohol or aluminum amalgam, or by reaction of propyl alcohol and metallic aluminum in the presence of $SnCl_4$ or iodine.

Aluminum butyrate, the aluminum derivative of butyl alcohol, $Al(OC_4H_9)_3$ is a white solid, melting at 102° C., with a specific gravity of 1.025. It is soluble like the propylate and likewise forms alumina on hydrolysis. It is prepared like the propylate, using anhydrous butyl alcohols.

Zinc ethylate, $Zn(OC_2H_5)_2$ is a white powder of high melting point, sparingly soluble in alcohol or benzol, and is prepared by action of anhydrous ethyl alcohol on zinc chloride, or alcohol on zinc with a suitable catalyst. On hydrolysis, insoluble zinc oxide is formed.

Aluminum ethylate, $Al(OC_2H_5)_3$ is a white solid, melting at 135° C., specific gravity 1.142 at 20° C. It is soluble in oil, alcohol and benzol and gives an alumina deposit on hydrolysis. It is prepared by the action of anhydrous alcohol on aluminum with $SnCl_4$ as a catalyst.

Tri-chlor stannic ethylate, $SnCl_3OC_2H_5$ is another alkylated metal of useful properties. This compound is a solid melting at 100° C., soluble in alcohol and petroleum, and decomposes to give insoluble tin hydroxide on contact with water.

While these compounds have been described as pure substances, in my process the substances injected for water shut-off can be, and usually are, mixtures of crude reaction products containing more or less proportions of by-products. In cases where the substances are prepared by reaction of the chlorides with alcohol, part of the HCl formed can be left in the product to serve as accelerator, the excess being removed.

All these compounds have, to a greater or less degree, the desired delayed action characteristics. They are all suitable for use with the accelerators mentioned. In general, I can use compounds which have a polyvalent metal carrying one or more organic groups as described and which are capable of hydrolyzing with water to form a water-insoluble sealing mass consisting mostly of the insoluble hydroxide or hydrated oxide of the metal or non-metal. The plugging mass is an insoluble gel. The organic substitution groups can be alkyl groups or aryl groups, as illustrated in the foregoing examples.

What I claim is:

1. In a process for decreasing the permeability of a porous formation, the steps of introducing thereinto an alcoholate of a metal forming a water-insoluble hydroxide, and forming within said formation a water-insoluble hydroxide by reaction of said alcoholate with water.

2. In a process for sealing off water and gas-bearing formations traversed by a well, the steps of introducing into the well a treating non-aqueous liquid comprising an alcoholate of a metal forming water-insoluble hydroxides, applying pressure to force said liquid into the formations, and introducing into the well and forcing into the formations an aqueous liquid, to intermingle said non-aqueous liquid and said aqueous liquid within the formations, whereby a water-insoluble metallic hydroxide is precipitated within said formations.

3. A method of sealing porous water-containing formations adjacent oil and gas wells, which comprises injecting into the formations a compound of a polyvalent metal the oxides and hydroxides of which are substantially insoluble in water, said metal carrying at least one OR group the oxygen atom of which is directly attached to the metal atom and wherein R is selected from the class consisting of alkyl and aryl groups; whereby an insoluble sealing mass is produced in the porous formations by reaction of water with said compound.

4. A method of sealing porous water-containing formations adjacent oil and gas wells, which comprises injecting into the formations a compound represented by $M(OR)_n$ wherein M is a polyvalent metal the oxides and hydroxides of which are substantially insoluble in water, R is selected from the class consisting of alkyl and aryl groups and $n$ is the valency of the metal, whereby an insoluble sealing mass is produced in the formations by reaction of water with said compound.

5. The method of claim 3 wherein said compound is injected in solution in a non-aqueous solvent.

6. The method of claim 3 wherein a charge of water is injected into the formations prior to injection of said compound.

7. The method of claim 3 wherein the compound is injected in admixture with a substance selected from the class consisting of acids and substances which yield acids in the solution, which substance accelerates reaction of water with said compound.

HARVEY T. KENNEDY.